3 Sheets—Sheet 1.
F. & O. HAENICHEN,
Assignors to themselves and O. SEEBASS.
ELECTRIC PENDULUM CLOCK.
No. 10,720. Reissued May 11, 1886.
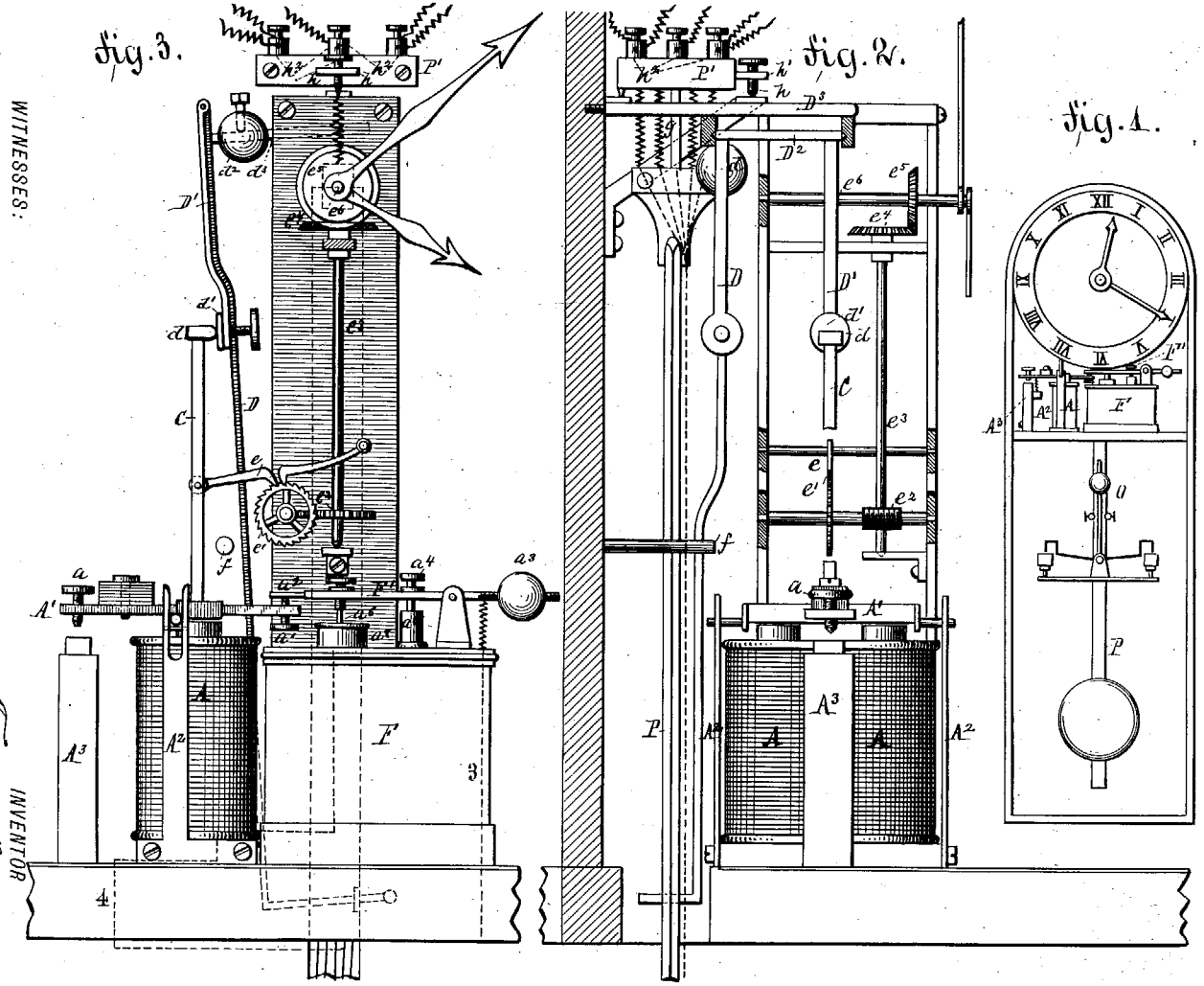
WITNESSES:
F. H. Rosenbaum
Martin Petry.
INVENTOR
Friedrich Haenichen
BY Otto Haenichen
Geipel & Raegener
ATTORNEYS.

F. & O. HAENICHEN,

Assignors to themselves and O. SEEBASS.

ELECTRIC PENDULUM CLOCK.

No. 10,720. Reissued May 11, 1886.

WITNESSES:
L. K. Rosenbaum.
Martin Petry.

INVENTOR
Friedrich Haenichen
Otto Haenichen
BY
Goepel & Raegener
ATTORNEYS.

F. & O. HAENICHEN,

Assignors to themselves and O. SEEBASS.

ELECTRIC PENDULUM CLOCK.

No. 10,720. Reissued May 11, 1886.

WITNESSES:

Fol. N. Rosenbaum.
Martin Petry.

INVENTORS

Friedrich Haenichen
Otto Haenichen
BY
Gopel & Ro, ner
ATTORNEYS.

UNITED STATES PATENT OFFICE.

FRIEDRICH HAENICHEN AND OTTO HAENICHEN, OF PHILADELPHIA, PA., ASSIGNORS TO THEMSELVES, AND OSCAR SEEBASS, OF NEW YORK, N. Y.

ELECTRIC PENDULUM CLOCK.

SPECIFICATION forming part of Reissued Letters Patent No. 10,720, dated May 11, 1886.

Original No. 316,360, dated April 21, 1885. Application for reissue filed December 23, 1885. Serial No. 186,569.

*To all whom it may concern:*

Be it known that we, FRIEDRICH HAENICHEN and OTTO HAENICHEN, of Philadelphia, in the county of Philadelphia and State of Pennsylvania, have invented certain new and useful Improvements in Electric Pendulum Clocks; and we do hereby declare the following to be a full, clear, and exact description thereof.

This invention relates to an improved electric clock, which is economically operated by means of a weak and lasting battery, in which the residual magnetism of the actuating electro-magnet is neutralized, and the injurious effect of the induced sparks by the reversing of the current at the points of contact is avoided.

The invention consists of an electric clock, the oscillating pendulum of which carries a bracket-support on which the current-reversing device is supported, that is thrown into action when the pendulum arrives nearly at the end of its stroke. The pendulum is suspended by a spring from a supporting-bracket, through which the conducting-wires are conducted to the pendulum and the reversing device. The impulse is given to the pendulum by an oscillating and weighted crutch that is actuated by a lever-arm of the oscillating armature, which arm also transmits by intermediate mechanism motion to the gear-wheels, by which the hands are worked. The residual magnetism of the electro-magnet is moved by alternately passing currents of opposite direction through the electro-magnet by means of the reverser, as will appear more fully hereinafter, and finally be pointed out in the claims.

Figure 5:
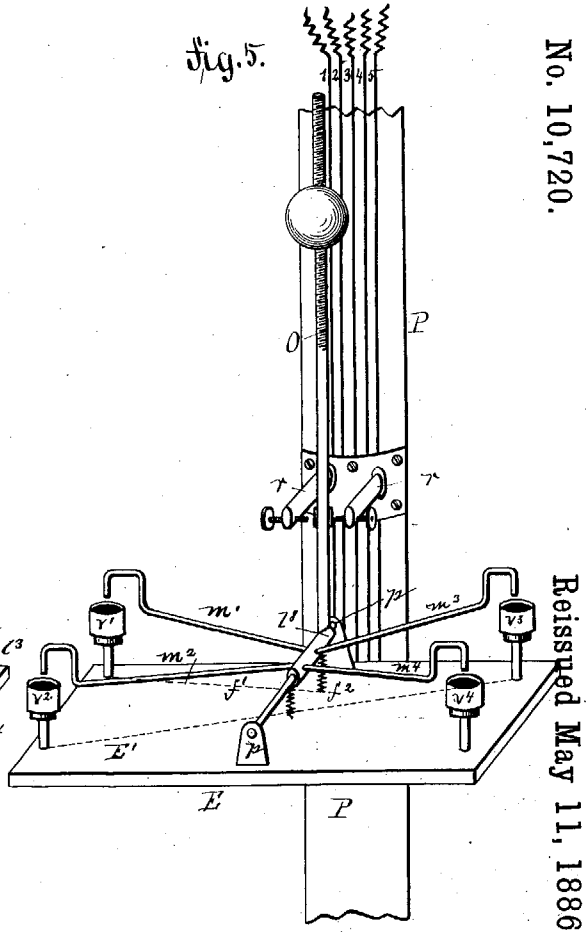
Figure 4:
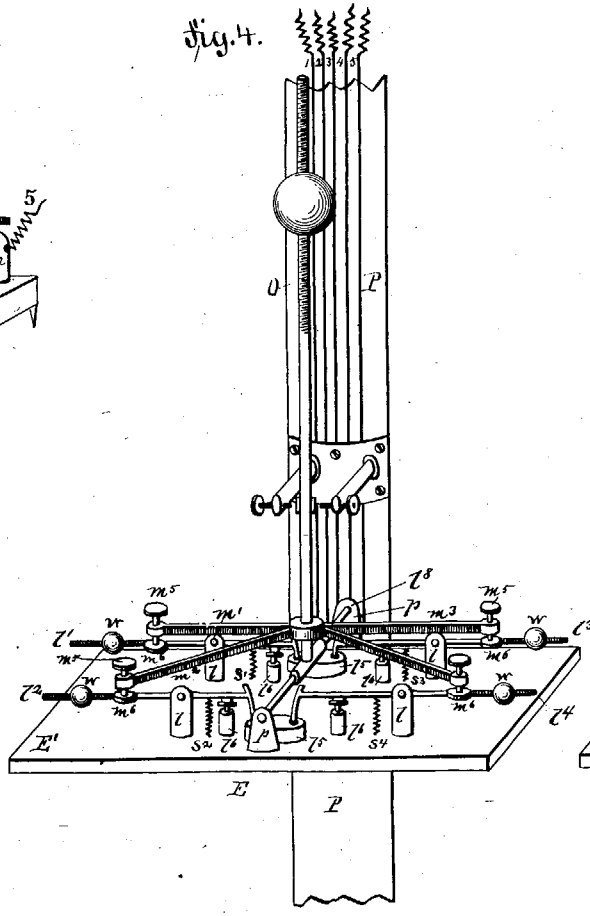
Figure 3:
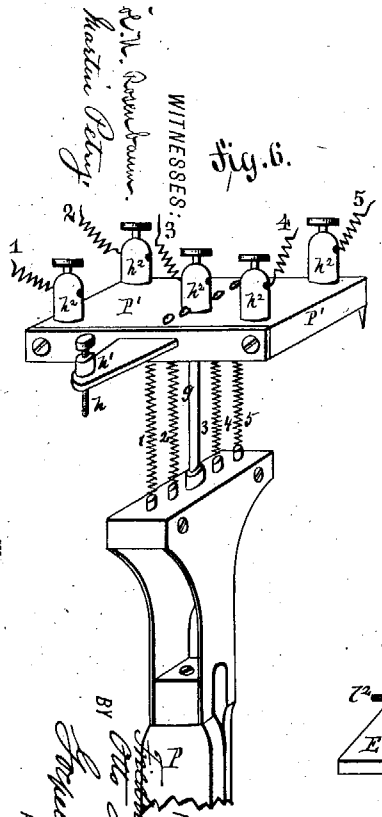
Figure 7:
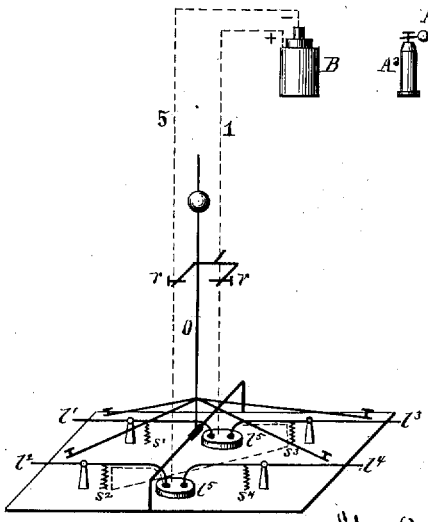
Figure 8:
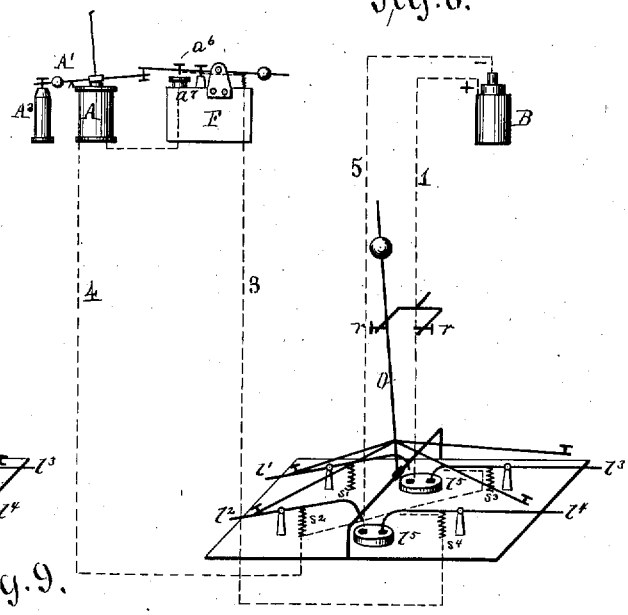
Figure 9:
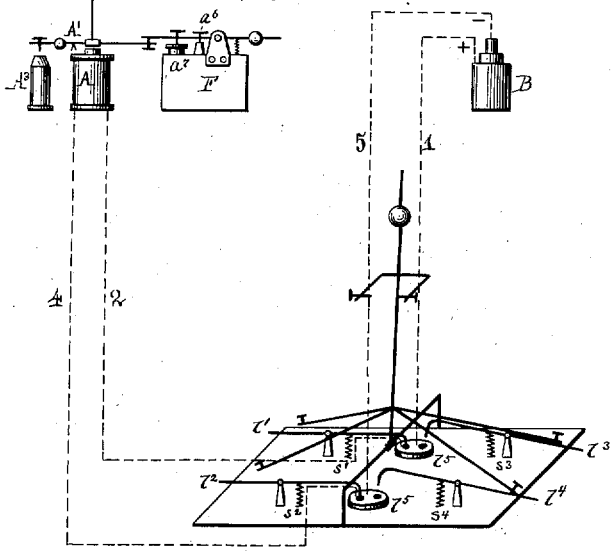

In the accompanying drawings, Figure 1 represents a front view of our improved electric clock. Figs. 2 and 3 represent, respectively, a sectional side elevation and a front view of the clock-actuating mechanism. Fig. 4 represents a perspective view of the current-reversing mechanism. Fig. 5 is a perspective view of a simpler modification of the same. Fig. 6 is a perspective view of the pendulum-support; and Figs. 7, 8, and 9 are diagrams illustrating the course of the current in the different positions of the reverser.

Similar letters of reference indicate corresponding parts.

The battery employed for working our improved electric clock may be of any approved type, preferably that derived by Meidinger, which has the property of furnishing weak currents for a considerable length of time without requiring replenishing.

B in the drawings represents the battery, which is located in the clock-case, or at any other suitable place.

An electro-magnet, A, is supported below the clock mechanism, and provided with a nicely-balanced armature, A′, that is fulcrumed in vertical standards $A^2$. The armature A′ is provided with contact-screws *a a′* at both ends, that form contact with a fixed post, $A^3$, and with a spring, $a^2$, of the disconnector F. The armature A′ is provided with a fixed upwardly-extending lever-arm, C, having a stud, *d*, at its upper end, which stud forms intermittent contact with an adjustable disk, *d′* on the front arm, D′, of an oscillating crutch, D, that is supported by a horizontal steel shaft, $D^2$, having conically-tapering ends, to bearings of a horizontal bracket-arm, $D^3$, at the upper part of the clock-casing. The crutch D extends downward and engages at its lower end the pendulum P in any approved manner. An adjustable weight, $d^2$, is applied to a fixed arm, $d^3$, that extends at right angles from the upper part of the crutch D, as shown in Fig. 3, said weight returning the crutch D into contact with the stud *d* of the lever-arm C after an impulse has been given to the crutch by said arm. The armature A′ is attracted by the electro-magnet A at each stroke of the pendulum when the battery-circuit is closed. The attraction of the armature A′ moves the lever-arm C sidewise, and imparts a lateral oscillation to the crutch D. On the interruption of the circuit the armature A′ is released and the arm C moved back, whereby the crutch D, and thereby the pendulum, receives its return motion until the former is arrested by the stop-pin *f*. The lever-arm C also imparts, by a pivot-pawl, *e*, intermittent motion to a ratchet-wheel, *e′*, which latter transmits, by a worm-gear, $e^2$, vertical shaft $e^3$, and bevel-gears $e^4$ and $e^5$ rotary motion to a horizontal shaft, $e^6$, which operates the minute and hour hands by the usual gearings. (Not shown in the drawings.)

The disconnector F consists of a fulcrumed lever, F′, that is balanced by a weight, $a^3$, at the end opposite to that to which the contact-spring $a^2$ is applied. A contact-screw, $a^4$, and post $a^5$ determine the dip of the lever F′. A platinum pin, $a^6$, between the spring $a^2$ and the contact-screw $a^4$, dips into a mercury-cup, $a^7$, and closes the battery-circuit until the lever F′ is lifted by the dropping of the armature-lever A′, whereby the current will be instantly interrupted.

The pendulum P is suspended from a fixed plate, P′, at the upper part of the clock-casing by means of a flat steel spring, $g$, which also serves as one of the conductors of electricity. The supporting-plate P′ is supported on suitable brackets and adjusted thereon into a horizontal position by means of a set-screw, $h$, applied to a forward-extending bracket, $h'$, of the supporting-plate P′, for the purpose of adjusting the suspension-spring properly into a vertical position. The supporting-plate P′ is provided with five screw-posts and binding-screws, $h^2$, to which the current-transmitting wires are applied. The screw-posts $h^2$ are connected by the steel suspension-spring and four spiral wires with five contact-wires, that are arranged in the pendulum P, as shown clearly in Figs. 4 and 5. The spiral conducting-wires adapt themselves to the position of the pendulum without interfering in the least with the oscillations of the same.

The pendulum P is preferably made of well-seasoned and varnished pine wood, which is but little liable to change by atmospheric influences. The conducting-wires lead to the reverser E, which is supported on a bracket, E′, attached to the pendulum, as shown in Figs. 1, 4, and 5.

The reverser E consists of four levers, $l^1$ $l^2$ $l^3$ $l^4$, which are fulcrumed to posts $l$ $l$ of the bracket E′, the levers being balanced by adjustable weights $w$ at their outer ends. The inner ends of the levers are provided with platinum pins, which dip into mercury-cups $l^5$ at the central part of the bracket E′. Stops $l^6$ regulate the dip of the levers, which are electrically connected by spiral springs $s^1$ $s^2$ $s^3$ $s^4$ with the conducting-wires arranged on the pendulum P. A transverse shaft, $l^7$, is supported in central bearings, $p$ $p'$, of the bracket E′, said shaft carrying an upright oscillator, O, with an adjustable weight at its upper end. From the lower part of the oscillator O extend diagonal arms $m^1$ $m^2$ $m^3$ $m^4$, which are provided at their ends with contact-screws $m^5$, for the purpose of regulating the upward motion of the platinum points of the levers $l^1$ $l^2$ $l^3$ $l^4$. The screws $m^5$ form contact with disk-shaped enlargements $m^6$ of the levers $l^1$ $l^2$ $l^3$ $l^4$.

During the oscillating motion of the pendulum P—for instance, from the right to the left—the oscillator is held in contact with the left-hand stud $r$ by the momentum imparted by the pendulum to its weight; but as soon as the pendulum P reaches its extreme point the oscillator O falls over by the force of gravity to the right-hand contact-stop $r$, and is retained in this position throughout the entire oscillation of the pendulum from left to right. When the pendulum P arrives at the extreme right end of its oscillation, the oscillator is dropped back by gravity to the left-hand stud $r$, and so on alternately. In this position of the oscillator the connections are made by the levers $l^1$ $l^2$ with the mercury-cups $l^5$, as shown in Fig. 9. The circuit is thereby closed, the current flowing from the positive pole of the battery B, conducting-wire 1, pendulum P, mercury-cup $l^5$, lever $l^1$, spring $s^1$, wire 2, electro-magnet A, wire 4, spring $s^2$, lever $l^2$, mercury-cup $l^5$, and wire 5 to the negative pole of the battery. The armature of the electro-magnet is thereby attracted and retained in this position until the pendulum P reaches its extreme point at the right-hand side, at which moment the oscillator O drops toward the left and changes the connections, so that the current takes the course indicated by the diagram Fig. 8—that is to say, from the positive pole of the battery, conducting-wire 1, mercury-cup $l^5$, lever $l^3$, spring $s^3$, connecting-wire 6, conducting-wire 4, to the electro-magnet, thence to the mercury-cup of the disconnector F, over the same and wire 3 to spring $s^4$, lever $l^4$, mercury-cup $l^5$, and conducting-wire 5, back to the negative pole of the battery. As the current is thus made to flow in a reverse direction through the coils of the electro-magnet, it has the effect of neutralizing the weak residual magnetism still remaining in the cores of the same. As soon as the residual magnetism is neutralized, the armature-lever is dropped, and at the same time the disconnector-lever F′ lifted, whereby the circuit is interrupted by raising the pin $a^6$ out of the mercury-cup $a^7$. This takes place before the current can exert its full effect upon the cores of the electro-magnet and attract thereby the armature. In the interval of time during which the oscillator O falls from one contact-stop $r$ to the other, the arms $m^1$ $m^2$ $m^3$ $m^4$ are not in contact with the levers $l^1$ $l^2$ $l^3$ $l^4$, while the ends of the latter are immersed for a moment into the mercury-cups $l^5$ $l^5$ before the connection of the levers $l^1$ $l^2$ and arms $m^1$ $m^2$ is made. By this means a direct battery-current is interpolated to prevent induced sparks at the point of disconnection of the arms $m^1$ $m^2$ and levers $l^1$ $l^2$, which sparks would exert an injurious influence upon the platinum contacts.

When the oscillator O is in its intermediate position, as shown in Fig. 4, the current flows, as indicated in Fig. 7, from the positive pole of the battery by wire 1 to the mercury-cup $l^5$, thence along lever $l^3$, spring $s^3$, wire 6, spring $s^2$, lever $l^2$, mercury-cup $l^5$, and connecting-wire 5, to the negative pole of the battery.

In the modification shown in Fig. 5 the reverser E is constructed of four mercury-cups, $v^1$ $v^2$ $v^3$ $v^4$, which are supported on posts at the corners of the bracket E'. In these cases the levers $l' l^2 l^3 l^4$ are dispensed with and the connections made directly by the arms $m' m^2 m^3 m^4$ of the oscillator O, which dip alternately into the mercury-cups $v' v^2$ and $v^3 v^4$. The dipping-points of the arms can be made of any material that admits of amalgamation. Each pair of arms $m' m^2$ and $m^3 m^4$ has to be insulated from the shaft of the oscillator. The action of this reverser is the same as that of the other form of reverser described, the connections being made through the supporting-posts of the mercury-cups and the conducting-wires 1 to 5 of the pendulum, as before.

Any other equivalent construction of the reverser may be used, provided that the following functions are performed: First, that by the action of its oscillator the current of the battery is first conducted in one direction through the electro-magnet, so as to attract its armature and give the required impulse to the pendulum and clock mechanism; secondly, that in the intermediate position of the oscillator the electro-magnet is cut out and a direct battery-current introduced into the reverser; and, thirdly, that by the opposite position of the oscillator the current is made to flow in a direction opposite to that in which it flows in the first position of the oscillator, so that the residual magnetism in the electro-magnet is neutralized, and thereby the injurious effect of the induced currents obviated.

The interpolation of a direct battery-current at the intermediate position of the oscillator prevents induced sparking, and renders thereby the contact-points of the reverser more durable, as they are not liable to corrosion.

It is obvious that in place of the mercury-cups platinum contact-plates may be used; but as they are liable to oxidation in the course of time, which might to a slight extent affect the proper working of the reverser, it is preferable to use mercury-contacts, as by these even the slight effects of oxidation are avoided.

As, owing to the removal of the residual magnetism, the loss of the current is very small, a weak battery may be employed, which has the advantage that it will last for a considerable length of time, so that the clock can be kept in motion for years, if no other disturbing effects take place, without requiring a refilling of the battery.

Having thus described our invention, we claim as new and desire to secure by Letters Patent—

1. The combination of an oscillating pendulum, current closing and reversing devices, an electro-magnet, a balanced armature, and mechanism connecting said armature with the pendulum-crutch and the hands, operating-train for actuating the pendulum and the hands by the oscillations of the armature, substantially as set forth.

2. The combination of a pendulum, current closing and reversing devices, an electro-magnet, an armature having an upwardly-extending lever-arm adapted to oscillate the pendulum from the crutch, an oscillating weighted crutch engaging the pendulum, and mechanism operated by said armature for setting the hands in motion, substantially as set forth.

3. The combination of an oscillating pendulum, current closing and reversing devices actuated by said pendulum, an electro-magnet, a balanced armature actuated by said electro-magnet, a disconnector operated by said armature, and mechanism actuated by the armature, so as to oscillate the pendulum and set the hands in motion, substantially as set forth.

4. An electric clock consisting of a pendulum, an oscillating current-reversing device supported on the pendulum, an electro-magnet, a balanced armature actuated by said electro-magnet, and mechanism actuated by the armature, whereby the pendulum is oscillated and the hands set in motion, substantially as and for the purpose set forth.

5. In an electric clock, a pendulum suspended by a spring from a supporting-plate and connected by spiral conductors with the binding-post of the supporting-plate, substantially as set forth.

6. In an electric clock, the combination of an electro-magnet, a balanced armature provided with a fixed lever-arm, an oscillating crutch, a pendulum actuated by said crutch, and transmitting mechanism actuated by the lever-arm of the armature, whereby motion is imparted to the hands of the clock, substantially as specified.

7. In an electric clock, the combination of an oscillating pendulum, a battery, an oscillating reverser supported on the pendulum, an electro-magnet, a balanced armature, a fulcrumed disconnector operated by the armature, the reverser, electro-magnet, and disconnector being in circuit with the battery, whereby at each stroke of the pendulum a current is passed first in one direction through the electro-magnet, and then in the opposite direction, so as to neutralize the residual magnetism of the same, substantially as set forth.

8. In an electric clock, the combination of a pendulum having contact-stops, a reversing device supported on said pendulum, and consisting of a weighted oscillator that moves between said contact-points, and of contact levers and plates actuated by the oscillator, whereby the circuit is first closed and the current passed in one direction, and then reversed and instantly interrupted, substantially as set forth.

9. In an electric clock, a current-reverser supported on the bracket-plate of the pendulum, and constructed of an upright oscillating lever and of contact-levers actuated by the oscillator, whereby the circuit is closed, reversed, or interrupted and induced sparks prevented, substantially as set forth.

10. In an electric clock, the combination of a pendulum having a supporting-bracket plate, an upright oscillating lever fulcrumed to bearings of the bracket-plate and moving between contact-stops on the pendulum, lever-arms extending from the oscillator, and metallic connections supported on the bracket-plate with which the arms of the oscillator form alternating contact at each oscillation of the pendulum, substantially as set forth.

In testimony that we claim the foregoing as our invention we have signed our names in presence of two subscribing witnesses.

FRIEDRICH HAENICHEN.
OTTO HAENICHEN.

Witnesses to signature of Friedrich Haenichen:

X. CARDINAL,
J. J. FINNEGAN,

Witnesses to signature of Otto Haenichen

ALFRED THOMPSON,
CHAS. P. KELLY.